Figure 1:
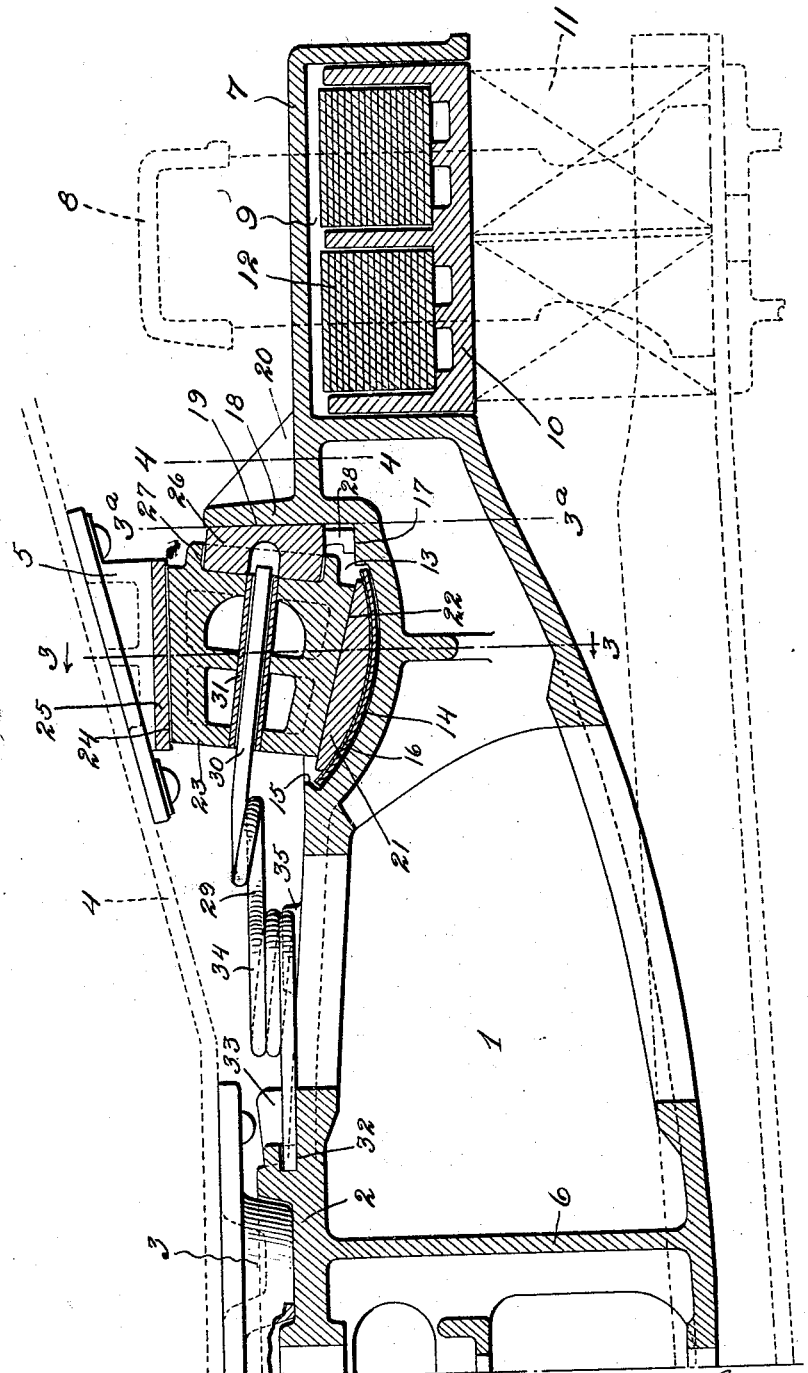

Feb. 9, 1932.    T. H. SYMINGTON    1,844,022
TRUCK BOLSTER
Filed Jan. 25, 1927    3 Sheets-Sheet 1

Inventor
Thomas H. Symington

Witness
John Milton Luster

By
His Attorney

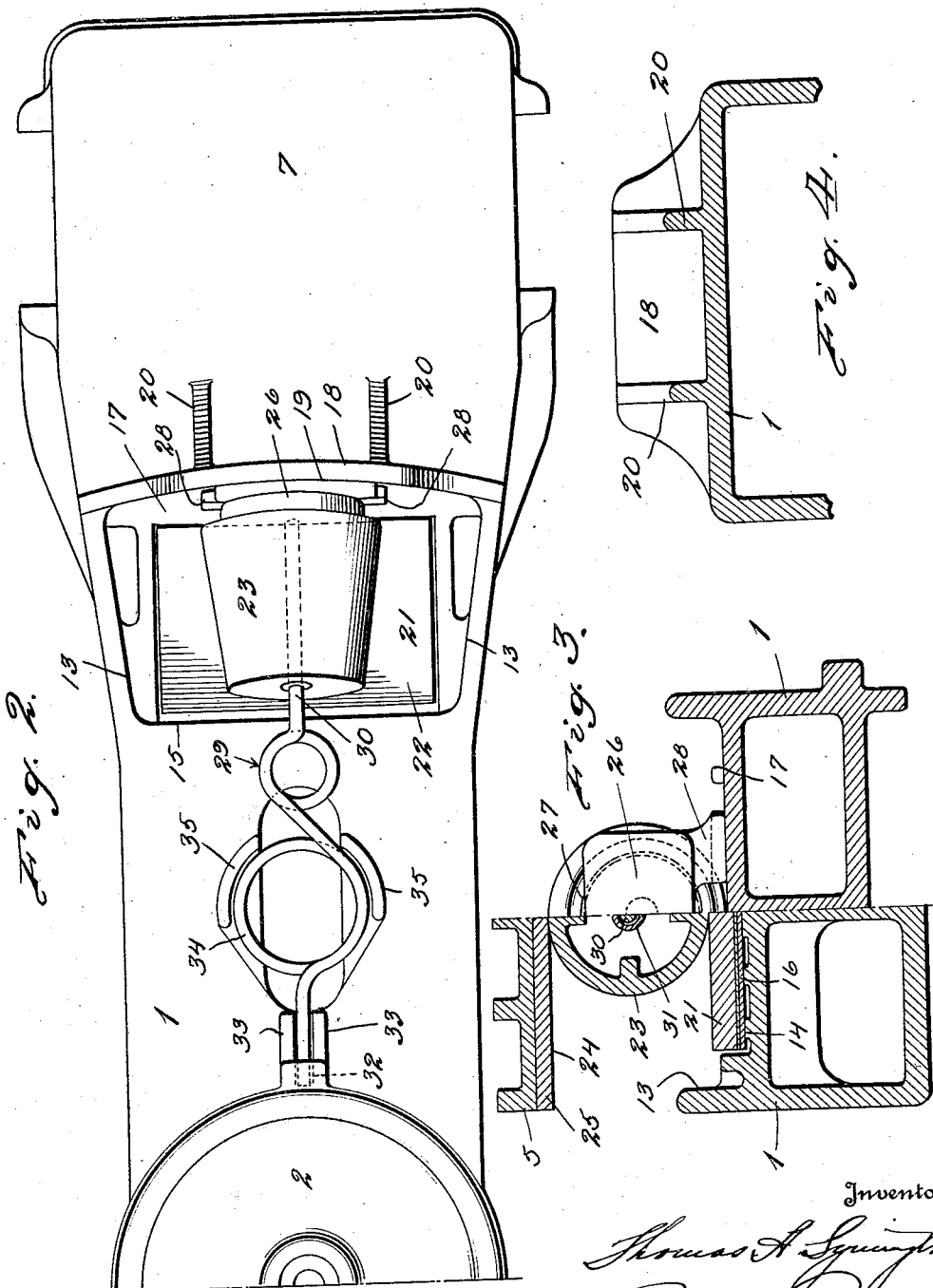

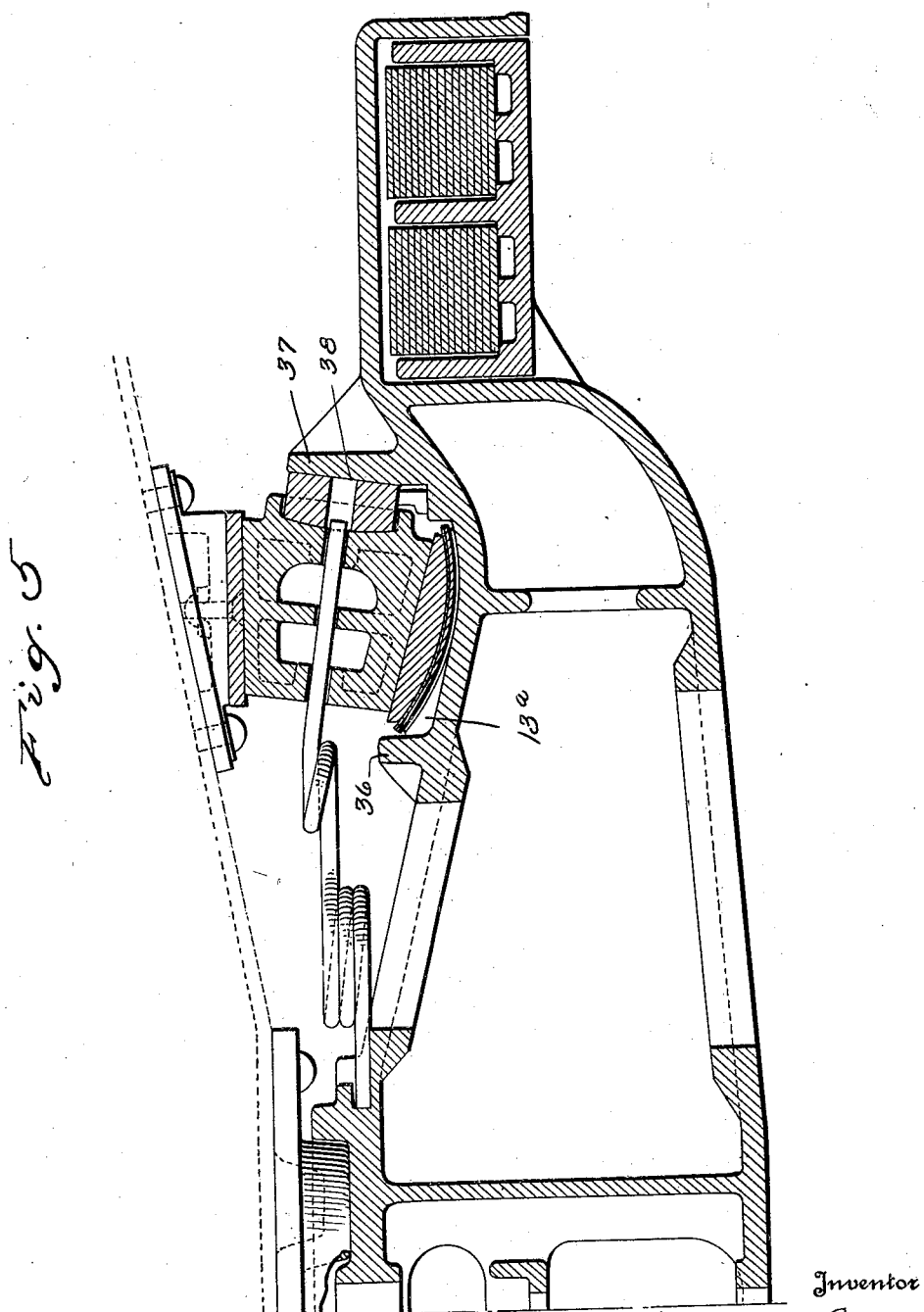

Patented Feb. 9, 1932

1,844,022

UNITED STATES PATENT OFFICE

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND

TRUCK BOLSTER

Application filed January 25, 1927. Serial No. 163,373.

The invention relates to truck bolsters forming part of railway car trucks.

The principal object of the invention, generally stated, is to provide an improved truck bolster having side bearings so related to the other parts and so arranged with respect thereto that the normal weight of the car is sustained at the center bearing, the side bearings functioning in a well known manner to take the pressure and withstand and distribute the forces incident to any tendency of the body bolster to rock with respect to the truck bolster, the structure consequently operating to reduce car roll and prevent side sway.

An important object of the invention is to provide a truck bolster having side bearings which coact with the truck and body bolsters of a roller type so mounted as to adjust themselves automatically to variations in the slope or inclination of the bearing surfaces on the truck and body bolsters.

Another object of the invention is to provide a truck bolster equipped with side bearing rollers and provided with spring means for normally maintaining the rollers in centered relation and returning them to such position after swivelling movement of the truck and body bolsters, there being consequently an absence of any necessity for providing centering teeth or the like as is the practice in some instances.

A more specific object of the invention is to provide a truck bolster having pockets near its ends for the reception of the side bearing rollers, it being consequently possible to employ rollers of larger diameter than ordinarily, such larger rollers naturally having greater strength and rolling more freely than small ones.

Still another object of the invention is to provide means for taking up the outward end thrust of the side bearing rollers, and other means for taking up any play between the side bearings and the bearing elements depending from the body bolster as might result from wear developing after prolonged use.

Yet another object of the invention is to provide a truck bolster which may be provided in its ends with shock absorption spring mechanism operating in series with the truck springs or which may be unprovided with such, but which is in either instance constructed generally along standard lines so as to be capable of employment as a replacement bolster to be installed in a truck without involving any changes in the construction of any of the parts thereof.

Another important object of the invention is the provision of auxiliary springs working in series with the existing truck springs and giving increased spring travel which is necessary when cars are run without side bearing clearances.

An additional object of the invention is to provide a bolster construction of this character and embodying these advantageous features but which will at the same time be simple and inexpensive to make, assemble and install, positive in action, efficient and durable in service, and a general improvement in the art.

With the above and other objects and advantages in view, the invention preferably consists in the detailed construction and the arrangement and combination of parts to be hereinafter more fully described and claimed, and illustrated in the accompanying drawings in which:

Figure 1 is a vertical longitudinal sectional view through one end of a bolster constructed in accordance with the invention, Figure 2 is a top plan view thereof, Figure 3 is a vertical cross section one half thereof being taken on the line 3—3 and the other half being taken on the line 3ª—3ª of Figure 1, Figure 4 is a detail cross section taken on the line 4—4 of Figure 1, and Figure 5 is a view similar to Figure 1 illustrating slight modifications.

Referring more particularly to the drawings the numeral 1 designates the bolster which is or may be of the same general construction in point of contour, etc. as those of standard pattern and which is provided with a center bearing 2 receiving the center plate 3 carried by the body bolster 4 which is also equipped with a side bearing element 5. The bolster 1 is provided at each side of its center with an upstanding web 6 beneath that portion where the center bearing is located, this being for reinforcing purposes, and at each end the bolster is formed with a reduced extension 7 mounted within the window opening of the side frame 8 in the usual manner.

Each extending portion 7 may, if desired, be provided with a pocket 9 within which is mounted a combined spring seat and follower 10 resting upon the truck springs illustrated diagrammatically at 11, this combined seat and follower carrying a group or groups of plate or leaf springs 12 having their ends engaging against the top of the pocket and operating in series with the truck springs 11 in a manner set forth in my co-pending application Serial No. 177,285, filed March 22, 1927. The provision of the auxiliary spring mechanism is important inasmuch as it will provide or give increased spring travel which is necessary when cars are run without side bearing clearances, as will be understood.

In carrying out the present invention the top of the bolster 1 is formed near each end and inwardly of each extension 7 with a pocket 13 having a wall 14 which is curved at least in one direction and which is preferably partially cylindrical, the curvature being longitudinally of the bolster. At the inner edge of each pocket 13 is preferably, though not necessarily, provided a slight overhang 15 which will constitute retaining means for one or more shims 16 located upon the wall or bearing surface 14, the number of shims used depending upon circumstances. The pocket 13 has its bottom formed at its outermost portion with a flat bearing surface 17 for a purpose to be described. The top of the bolster is preferably formed with an upstanding flange 18 having, in this form of the invention, a vertical face 19 and this flange is preferably reinforced by bracing webs 20.

Mounted within the pocket 13 upon the shims therein is a bearing member 21 having a flat top surface 22 and a curved lower surface corresponding to the curvature of the pocket wall 14 and consequently capable of moving about on the shims, this bearing member being necessarily of less width or length than the pocket to permit this action. Engaged in turn upon the bearing member 21 is a roller 23 preferably of conical shape and adapted to roll upon the bearing member 21 during swivelling movement of the truck and body bolsters. This roller conformingly engages against the flat top surface 22 of the bearing member 21 and is adapted to engage against the flat bottom surface 24 of a wear plate 25 mounted on the underside of the bearing element 5 which depends from the body bolster. Obviously, the wear plate 25 may be omitted in which event the roller would operate directly against the bearing element 5. Under normal circumstances it is intended that the roller 23 be spaced slightly from the bearing member 5 or its wear plate 25, the normal load being sustained by the center bearing and the side bearing rollers coming into play only when there is any tendency of the body bolster to rock vertically. It will be noted that the bearing member 21 is incapable of shifting transversely of the bolster but can move longitudinally thereof upon the shims in the pocket so as to permit the surface 22 to accommodate itself to the position of the roller, the roller in turn being able to accommodate itself so as to contact properly with the wear plate 25 or bearing member 5. In this way line contacts are insured whereas otherwise strains might come upon the forward or rear edges of the roller.

Obviously, there is bound to occur an end thrust on the side bearing rollers tending to force them outwardly and for this reason I have provided thrust bearing members 26, one for each roller, each being located between the roller and the upstanding flange 19 on the bolster and bearing flatly against the latter. To maintain the thrust bearing in proper relation to the roller, the latter is preferably formed with a recess 27 receiving the former. It is also advisable to form or otherwise provide the thrust bearing member with leg portions or bearing feet 28 slidably mounted along and upon the flat surface 17 at the outer end of the pocket as clearly indicated in Figures 1 and 3. It is also preferable that the entire end thrust bearing be constructed of a material softer than that from which the bolster is made so as to take the wear, it being clear that whenever the size of the bearing becomes reduced to an excessive extent the worn one may be replaced by a new one.

Another feature of the invention is the provision of means for normally maintaining the rollers centered and for returning them to normal or intermediate position after swivelling movement of the bolsters. In carrying out this feature I prefer to employ a spring 29 of any preferred type mounted upon the top of the bolster and having one arm 30 suitably connected with the roller 23 as for instance by passing through a bushing 31 in the center thereof. Of course there are two springs, one for each roller, and it is equally apparent that some means must be provided for mounting them upon the bolster. While this might be done in various ways each side of the flange defining the center bearing 2 is here disclosed as having a socket 32 receiving the inner end of the spring, spaced upstanding webs 33 being provided on the top of the bolster adjacent the socket for receiving the spring between them and holding it firmly. As mentioned above, the spring might be of any preferred form but in the present instance it is represented, for purposes of illustration only, as having a coiled intermediate portion 34 which will provide the necessary resilience. The spring may be additionally retained in place by arcuate flanges 35 located at opposite sides of the coiled portion 34 as clearly shown in Figure 2, this being, however, a minor detail.

Referring to Figure 5 it will be observed that I have disclosed a slight modification in which the pocket 13ª in the bolster, corresponding to the pocket 13 of the first described form, is defined between two upstanding flanges 36 and 37, the latter corresponding to the flange 19 of the first form and being identical therewith except that its thrust receiving face 38 is inclined upwardly and outwardly instead of being vertical. In this form the flange 36 performs the same function as the overhang 15 in the first form. In other respects this modification is substantially the same as the first described form.

In the operation it will of course be seen that under normal circumstances the load is sustained at the center bearing and it will be equally clear that when any vertical rocking movement of the body bolster with respect to the truck bolster occurs one or the other of the side bearing elements 5 will engage against the adjacent roller 23 which will consequently transmit the load to the bolster near the end portion thereof. This will obviously prevent the development of car roll and side sway. The feature of the movability of the roller supporting bearings has already been described and a repetition thereof is unnecessary. After swivelling movement the rollers are returned to their normal or intermediate positions by virtue of the springs provided for the purpose. It is really believed that the construction, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In combination with a body bolster having a center plate and side bearing elements thereon, a truck bolster having a center bearing for the center plate and provided near its ends with pockets, rollers mounted within the pockets and adapted to be engaged by said side bearing elements, springs connected with the rollers for normally maintaining them in centered relation and for returning them to neutral position after relative swivelling movement of the bolsters, said springs having their outer ends extending journally through the rollers and having their inner ends anchored to the truck bolster at opposite sides of the center bearing thereon, and brace means on the bolster coacting with the springs in spaced relation to the anchored ends thereof and the rollers.

2. In combination with a body bolster having a center plate and side bearing elements thereon, a truck bolster having a center bearing for the center plate and provided near its ends with pockets, rollers mounted within the pockets and adapted to be engaged by said side bearing elements, spring means connected with the rollers for normally maintaining them in centered relation and for returning them to neutral position after relative swivelling movement of the bolsters, said springs having their outer ends extending journally through the rollers and having their inner ends anchored to the truck bolster at opposite sides of the center bearing thereon, the anchoring means including sockets formed in the upper portion of the bolster receiving the inner ends of the springs, and spaced upstanding webs formed on the top of the bolster adjacent the sockets receiving the springs between them.

3. In combination with a body bolster having a center plate and side bearing elements thereon, a truck bolster having a center bearing for the center plate and provided near its ends with pockets, rollers mounted within the pockets and adapted to be engaged by said side bearing elements, spring means connected with the rollers for normally maintaining them in centered relation and for returning them to neutral position after relative swivelling movement of the bolsters, said springs having their outer ends extending journally through the rollers and having their inner ends anchored to the truck bolster at opposite sides of the center bearing thereon, the anchoring means including sockets receiving the inner ends of the springs, spaced upstanding webs adjacent the sockets receiving the springs between them, the springs having coiled intermediate portions, and curved flanges rising from the truck bolster at opposite sides of and receiving said coiled portions of the springs.

4. In combination with a body bolster having a center plate and depending side bearing elements, a truck bolster having a center bearing receiving the center plate and formed near its ends with pockets each having a curved bottom, a bearing member within each pocket having a curved bottom surface conforming to that of the pocket and having a flat top surface, a tapered roller seated upon each of said bearing members and located beneath and adapted to be engaged by the side bearing elements depending from the body bolster, the curved coacting surfaces of the pocket and the bearing member therein permitting movement of the latter to accommodate itself for insuring line contact of the roller with its top surface and with the depending side bearing element carried by the body bolster, in combination with a spring anchored at one end to the bolster and having its other end journally engaging each roller, and thrust means at each pocket cooperating with the outer end of the roller.

5. In combination with a body bolster having a center plate and depending side bearing elements, a truck bolster having a center bearing receiving the center plate and formed near its ends with pockets, each pocket having a curved portion and a flat area, an upstanding thrust receiving flange on the top of the bolster at the outer end of each pocket, a bearing member within each pocket having a curved surface coacting with the curved portion thereof, a roller on each bearing member located beneath and adapted to be engaged by the side bearing element depending from the body bolster, and an end thrust member located between the outer end of each roller and the upstanding thrust receiving flange and having portions slidable along said flat area.

6. In combination with a body bolster having a center plate and depending side bearing elements, a truck bolster having a center bearing receiving the center plate and formed near its ends with pockets, each pocket having a curved portion and a flat area, an upstanding thrust receiving flange on the top of the bolster at the outer end of each pocket, a bearing member within each pocket having a curved surface coacting with the curved portion thereof, a roller on each bearing member located beneath and adapted to be engaged by the side bearing element depending from the body bolster, and an end thrust member located between the outer end of each roller and the upstanding thrust receiving flange and having portions slidable along said flat area, the outer end of the roller having a recess partially receiving said end thrust member for maintaining the same assembled with respect to the roller.

7. In combination with a body bolster having a center plate and depending side bearing elements, a truck bolster having a center bearing receiving the center plate and formed near its ends with pockets, each pocket having a curved portion and a flat area, an upstanding thrust receiving flange on the top of the bolster at the outer end of each pocket, a bearing member within each pocket having a curved surface coacting with the curved portion thereof, a roller on each bearing member located beneath and adapted to be engaged by the side bearing element depending from the body bolster, an end thrust member located between the outer end of each roller and the upstanding thrust receiving flange and having portions slidable along said flat area, and curved shims located between the curved portion of the pocket and the bearing member therein for taking up wear and effecting adjustment of the roller with respect to the side bearing element depending from the body bolster.

8. In combination with a body bolster having a center plate and side bearing elements thereon, a truck bolster having a center bearing for the center plate and provided near its ends with pockets, rollers mounted within the pockets and adapted to cooperate with said side bearing elements, springs for maintaining the rollers normally in centered relation, said springs having their outer ends extending journally through the rollers and having their inner ends anchored to the truck bolster, the anchoring means including sockets formed in the outer portion of the center bearing for receiving the inner ends of the springs, and spaced upstanding webs on the top of the bolster adjacent the center bearing defining grooves accommodating the springs adjacent the inner ends thereof.

9. In combination with a body bolster having a center plate and side bearing elements, a truck bolster having a center bearing for the center plate and provided near its ends with pockets, rollers mounted within the pockets for cooperation with said side bearing elements, spring means connected with the rollers for normally maintaining them in centered relation and for returning them to central or neutral position after relative swivelling movement of the bolsters, said springs having their outer ends extending journally through the rollers, anchoring means including sockets receiving the inner ends of the springs, the springs having coiled intermediate portions, and bracing means on the bolster cooperating with said coiled intermediate portions.

10. In combination with a body bolster having a center plate and depending side bearing elements, a truck bolster having a center bearing receiving the center plate and formed near its ends with pockets, an upstanding thrust receiving flange on the top of the bolster at the outer end of each pocket, a roller within each pocket cooperating with the side bearing element thereabove, and an end thrust member located between the outer end of each roller and the upstanding thrust receiving flange.

11. In combination with a body bolster having a center plate and depending side bearing elements, a truck bolster having a center bearing receiving the center plate and formed near its ends with pockets, an upstanding thrust receiving flange on the top of the bolster at the outer end of each pocket, a roller within each pocket cooperating with the side bearing element thereabove, an end thrust member located between the outer end of each roller and the upstanding thrust receiving flange, a guide surface inwardly of each flange, and means on each thrust member slidable along said guide surface.

In testimony whereof I affix my signature.

THOMAS H. SYMINGTON.